MAGNETIC TAPE SYSTEM
Filed Feb. 17, 1964
FIG. 1.
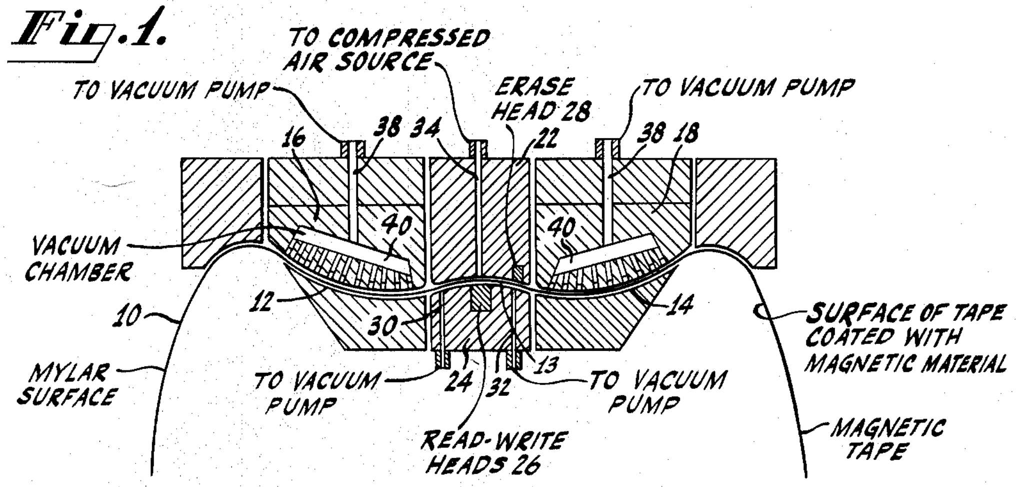
FIG. 2a.
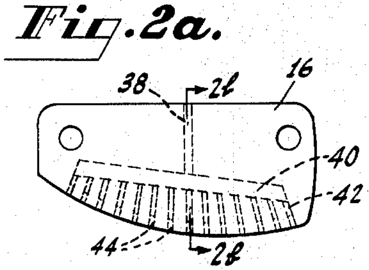
FIG. 3a.
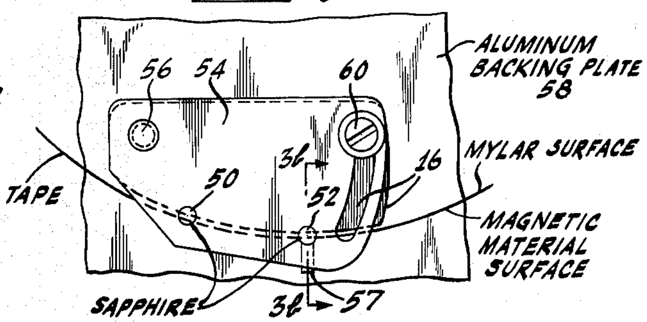
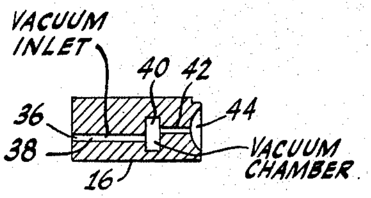
FIG. 2b.
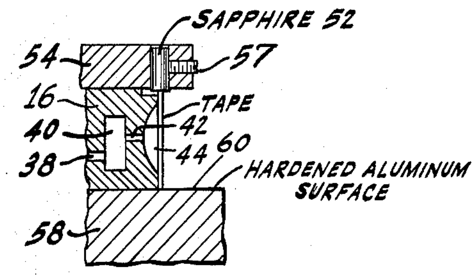
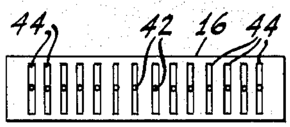
FIG. 2c.
FIG. 3b.
INVENTOR.
ROBERT H. JENKINS &
ROBERT D. GRAPES
BY [signature]
Attorney 3,227,348
Patented Jan. 4, 1966

3,227,348

MAGNETIC TAPE SYSTEM

Robert H. Jenkins, Audubon, and Robert D. Grapes, Woodbury, N.J., assignors to Radio Corporation of America, a corporation of Delaware Filed Feb. 17, 1964, Ser. No. 345,463
5 Claims. (Cl. 226—196)

This invention relates to an improved system for guiding a magnetic tape.

When a high speed magnetic tape travels past the read-write heads for the tape, it is important that the tape be guided accurately. It is also important that means be provided for damping out the mechanical resonances set up in the tape as a result of abrupt starts and stops of the tape. In the prior art, so-called pressure pads or arms which engage the surfaces of the tape are employed for both purposes. However, these pads or arms have the tendency to "steer" the tape and, in this way, cause twisting or "skew" of the tape. Such skew is undesirable and often results in recording and reading errors. Further, as the pads bear against the tape surfaces, they cause a certain amount of wear of the tape, both on the magnetic material and the backing material.

An object of this invention is to provide an improved tape guiding system which has neither of the disadvantages above.

In the guiding system of the invention, the tape guides form paths of opposite curvature and in this way provide substantial lateral rigidity to the tape. It is found that this lateral rigidity permits the tape to be guided more accurately. The curved guides are formed with a plurality of openings to which a vacuum is applied for causing the tape to bear against the guiding surface. The vacuum is applied to the back or Mylar surface of the tape, rather than to the surface of the tape coated with magnetic material (oxide), to avoid the problems of oxide wear. This method of guiding the tape is found to be very accurate and, in addition, the vacuum has the secondary advantage of cleaning the back of the tape.

The invention is discussed in greater detail below and is shown in the following drawings of which:

FIGURE 1 is a cross-section through the tape guiding system of the invention;

FIGURES 2*a*, 2*b* and 2*c* are plan, sectional and front views of portions of the system of FIGURE 1; and FIGURES 3*a* and 3*b* are plan and sectional views, respectively, of portions of the system of FIGURE 1.

The tape 10 shown in FIGURE 1 passes through three curved paths 12, 13 and 14. The tape guide elements 16 and 18, which define portions of these paths, are each formed with a vacuum chamber 40 which communicates with a plurality of openings (44 in FIGURE 2*c*) which open on the tape paths, as is discussed in more detail shortly.

The tape guiding element 22 is formed with an opening 34 to which compressed air may be applied. The tape guiding element 24 contains the read/write heads 26. Only one of the heads is shown. However, it will be appreciated that there are a plurality of such heads extending into and out of the paper, one head for each tape track. The tape erase head is shown schematically at 28 and is located in guiding element 22.

In the operation of the system of FIGURE 1, the tape 10 is driven by two capstans (not shown) one for each direction of tape motion. Each capstan comprises a continuously rotating drum. When it is desired to drive the tape, an idler drum moves toward the rotating capstan engaging the tape between the idler drum and the capstan.

The semicircular paths 12, 13 and 14, through which the tape moves, function to make the tape relatively rigid in the lateral plane (the plane of the tape). This permits the tape to be guided more accurately. The application of a vacuum to chambers 40 in the tape guiding elements 16 and 18, respectively, causes the air pressure in the guiding passageway to hold the tape in place against the guiding surfaces of the elements 16 and 18. The back or Mylar surface of the tape is the one which engages to the guiding surfaces of elements 16 and 18. Therefore, any tape wear due to friction or abrasion occurs on the back surface and not on the surface coated with magnetic material and is not deleterious to the tape performance. The vacuum also cleans the back of the tape as the tape moves.

The magnetic head member 24 includes passages 30 and 32 to which a vacuum is applied. These passages lead to openings which extend across substantially the entire tape width, as is discussed in more detail shortly. As the tape moves, the vacuum created at these openings removes any dirt or dust which may have accumulated on the surface of the tape coated with magnetic material.

The tape guiding element 22 is formed with a passageway 34 which also leads to openings which extend across the entire width of the tape, both at the read and write gaps. Compressed air is applied to this passageway and its purpose is to force the tape against the read/write heads. The use of compressed air at this point permits the pressure to be applied very uniformly over the entire tape width. In contrast, the conventional pressure pads formed of felt or other resilient material sometimes collect dirt or chips which cause localized high pressure points. As in the case of mechanical guides, an uneven pressure applied to the tape at the read/write heads causes tape skew.

The erase head 28 is shown in schematic form. It extends across the entire tape width. A piece of soft iron (not shown) is located in the head member 24 immediately opposite the pole pieces of the erase head 28. Erasure is accomplished by applying a direct current to the erase head. The magnetic field thereby produced magnetizes the magnetic tape in a direction perpendicular to the tape surface. So magnetized, there is very little coupling between the magnetic tape and the read/write heads 26, since the heads 26 sense magnetization in a direction parallel to the tape surface rather than perpendicular to it.

A more detailed showing of the element 16 appears in FIGURES 2*a*–2*c*. The construction of element 18 is substantially the same. As shown in FIGURE 2*b*, element 16 is formed with a vacuum inlet 36 which connects to a passageway 38 which in turn leads to a vacuum chamber 40. The chamber 40 is connected by a plurality of passagesways, one of which is shown at 42, to the openings 44 which face the back of the tape. The openings 44 and the passages 42 leading to these openings are shown more clearly in FIGURE 2*c*.

FIGURES 3*a* and 3*b* show the element 16 and, in addition, show the edge guides for the tape. The guide for the forward edge of the tape consists of a pair of sapphire elements 50 and 52 which are mounted in a forward edge guide plate 54. This plate is pivotable about a shaft 56. A slot cut into element 54, working in conjunction with bolt 60 permits the plate to be rotated to reveal the tape path for loading.

FIGURE 3*b* shows the plate 54 properly adjusted. Set screws 57 hold the sapphire elements in place. The adjustment is such that the passage in which the tape rides is approximately 3 mils smaller than the tape width. In other words, the tape is under a slight amount of compression and is slightly bowed. The bottom edge of the tape rides on an aluminum base plate 58. To prevent undue wear of this plate, its surface 60, on which the tape rides, is hardened.

While not shown in the figures, it should be mentioned that the openings for the vacuum passages 30 and 32 and for the compressed air passage 34 may be similar to the openings 44 shown in FIGURES 2 and 3. In all cases, the openings which communicate with the passages through which the tape moves extend across the entire width of the passage. This is to insure that the vacuum is applied uniformly across the tape width in the one case and that the compressed air is applied uniformly across the tape width in the other case. The uniform application of a vacuum and of air pressure cause the tape to be parallel to the guiding passage as it moves through the passage and minimizes inaccuracies due to twisting of the tape, that is, skew.

The vacuum system plus the curved tape passage also are found to provide very good damping for the tape when it starts and stops, even at relatively high tape speeds.

What is claimed is:

1. In a system for guiding a magnetic tape past read-write means, a curved path defined by guiding surfaces which are parallel to the tape surfaces, the guiding surface adjacent to the back surface of the tape being formed with apertures which open on the path and which communicate with an inlet to which a vacuum may be applied;

means coupled to said inlet for drawing air from the path into said apertures for causing the tape to engage the guiding surface containing said apertures as the tape is driven along the path;

a first edge guide for the tape arranged on one side of said path perpendicularly to said guiding surfaces; and a second edge guide for the tape arranged on the other side of said path perpendicularly to said guiding surfaces, said second edge guide being spaced from said first edge guide a distance 2 to 5 mils smaller than the width of the tape for slightly bowing the tape as it is driven along said path.

2. In a system for guiding a magnetic tape past read-write means, tape guiding elements having parallel curved walls which together define an undulating path whose walls are parallel to the tape surfaces as the tape moves, the wall on one side of said path adjacent to the back surface of the tape being formed with apertures which open onto two concave shaped regions of the path and which communicate with inlet means to which a vacuum may be applied, and the wall on the same side of said path adjacent to the back surface of the tape being formed with apertures which open on a convex shaped region of the path between the two concave shaped regions thereof and opposite said read-write means and which communicate with second inlet means to which compressed air may be applied;

means coupled to said first inlet means for drawing air from the path into the apertures coupled to said first inlet means for causing the tape to engage the wall containing said apertures as the tape is driven along said path; and means coupled to said second inlet means for applying compressed air to the tape as the tape is driven along said path for forcing the tape toward said read-write means.

3. In a system for guiding a magnetic tape past read-write means, tape guiding elements having parallel curved walls which together define an undulating path whose walls are parallel to the tape surfaces as the tape moves, the wall on one side of said path adjacent to the back surface of the tape being formed with apertures which open onto two concave shaped regions of the path and which communicate with inlet means to which a vacuum may be applied, and the wall on the same side of said path adjacent to the back surface of the tape being formed with apertures which open onto a convex shaped region of the path between the two concave shaped regions thereof and opposite said read-write means and which communicate with second inlet means to which compressed air may be applied;

means coupled to said first inlet means for drawing air from the path into the apertures coupled to said first inlet means for causing the tape to engage the wall containing said apertures as the tape is driven along said path;

a first edge guide for the tape arranged on one side of said path perpendicularly to said curved walls; and a second edge guide for the tape arranged on the other side of said path perpendicularly to said walls, said second edge guide being spaced from said first edge guide a distance slightly smaller than the width of the tape for causing the tape slightly to bow as the tape moves.

4. In a system for guiding a magnetic tape past read-write means, a curved path in the form of semicircles of opposite curvatures defined by pairs of curved parallel guiding surfaces which are parallel to the tape surfaces, and the guiding surface adjacent to the back surface of the tape being formed with apertures which open on two semicircular portions of the same curvature of the path and which communicate with first inlet means to which a vacuum may be applied and other apertures which open on a semicircular portion of the path between said two semicircular portions thereof and of opposite curvature thereto and which communicate with second inlet means to which compressed air may be applied;

means coupled to said first inlet means for drawing air from the path into said apertures for causing the tape to engage the guiding surface containing said apertures as the tape is driven along the path;

means coupled to said second inlet means for applying compressed air to said path as the tape is driven along said path;

a first edge guide for the tape arranged on one side of said path perpendicularly to said guiding surfaces; and a second edge guide for the tape arranged on the other side of said path perpendicularly to said guiding surfaces, said second edge guide being spaced from said first edge guide a distance slightly smaller than the width of the tape for slightly bowing the tape as it is driven along said path.

5. In a system as set forth in claim 4, said first edge guide comprising an aluminum surface and said second edge guide comprising sapphire elements which abut the second edge of the tape.

References Cited by the Examiner

UNITED STATES PATENTS

| | | | |
|---|---|---|---|
| 2,577,162 | 12/1951 | Smith | 242—76 X |
| 2,816,757 | 12/1957 | Burkhart | 226—95 |
| 3,109,573 | 11/1963 | Sameshima | 226—199 |

OTHER REFERENCES

RCA Technical Notes No. 498, September 1961, Langdon H. Fulton.

M. HENSON WOOD, Jr., *Primary Examiner.*

ROBERT B. REEVES, *Examiner.*